(12) United States Patent
De Smet

(10) Patent No.: US 10,924,589 B2
(45) Date of Patent: Feb. 16, 2021

(54) RF TRANSCEIVER AND WIRELESS MESH NETWORK

(71) Applicant: NXP USA, Inc., Austin, TX (US)

(72) Inventor: Bruno De Smet, Valbonne (FR)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 16/526,568

(22) Filed: Jul. 30, 2019

(65) Prior Publication Data

US 2020/0059538 A1 Feb. 20, 2020

(30) Foreign Application Priority Data

Aug. 20, 2018 (EP) .................................... 18306126

(51) Int. Cl.

| | | |
|---|---|---|
| *H04W 84/18* | (2009.01) | |
| *H04L 12/24* | (2006.01) | |
| *H04L 12/26* | (2006.01) | |
| *H04W 4/00* | (2018.01) | |
| *H04W 40/12* | (2009.01) | |
| *H04L 29/08* | (2006.01) | |
| *G06F 8/656* | (2018.01) | |
| *H04L 12/44* | (2006.01) | |
| *H04W 84/20* | (2009.01) | |

(52) U.S. Cl.
CPC .............. *H04L 67/34* (2013.01); *G06F 8/656* (2018.02); *H04L 12/44* (2013.01); *H04W 84/20* (2013.01)

(58) Field of Classification Search
CPC ............ G05B 19/4183; G05B 19/4184; G05B 19/41845; G05B 19/4185; G05B 13/028; G05B 15/02; H04L 67/34; H04L 67/12; H04L 45/48; H04L 41/12; H04L 67/125; H04L 12/44; G06F 8/656; H04W 84/20; H04W 84/18; G04F 8/656
See application file for complete search history.

(56) References Cited

U.S. PATENT DOCUMENTS

| | | | | |
|---|---|---|---|---|
| 8,270,382 | B2 * | 9/2012 | Cam-Winget | ...... H04W 12/003 370/338 |
| 8,976,733 | B2 * | 3/2015 | daCosta | ................ H04W 84/18 370/328 |
| 10,327,242 | B2 * | 6/2019 | Amini | .................... H04W 36/30 |
| 2002/0156554 | A1 * | 10/2002 | May | ........................ H04L 67/12 701/1 |

(Continued)

FOREIGN PATENT DOCUMENTS

| | | |
|---|---|---|
| CN | 10704836 A | 8/2017 |
| CN | 107589956 A | 1/2018 |
| KR | 20130015243 A | 2/2013 |

OTHER PUBLICATIONS

Maheswari et al., Reputation based mesh-tree-mesh cluster hybrid architecture for P2P live streaming, 4 pages (Year: 2016).*

(Continued)

*Primary Examiner* — Thuy Dao

(57) ABSTRACT

A RF transceiver for a mesh network node is described. The RF transceiver includes a RF transmitter and a RF receiver coupled to the processor. The RF transceiver is configured in a normal mode of operation as a network node in a wireless mesh network and is configured in a service mode of operation as a network node in a tree network.

10 Claims, 7 Drawing Sheets

(56) References Cited

U.S. PATENT DOCUMENTS

| | | | |
|---|---|---|---|
| 2008/0198824 A1* | 8/2008 | Wu | H04W 40/12 370/338 |
| 2010/0248707 A1* | 9/2010 | Hoffner | H04W 24/04 455/419 |
| 2011/0264915 A1* | 10/2011 | Cam-Winget | H04L 63/162 713/171 |
| 2014/0376473 A1* | 12/2014 | Leng | H04W 28/08 370/329 |
| 2015/0023155 A1* | 1/2015 | Shanmugavadivel | H04L 45/28 370/225 |
| 2017/0364348 A1 | 12/2017 | Klitenik et al. | |

OTHER PUBLICATIONS

Orphanoudakis et al., "Impact of Node Clustering on Network Cost and Resource Utilization", 2012 16th International Conference on Optical Network Design and Modelling (ONDM), IEEE, Colchester, UK, Apr. 17-20, 2012, pp. 1-5.

ZigBee, "Over-the-Air Upgrading Cluster", Revision 23, Version 1.1, document 095264r23, ZigBee Alliance, Mar. 12, 2014, pp. 1-66.

* cited by examiner

100

150

300

350

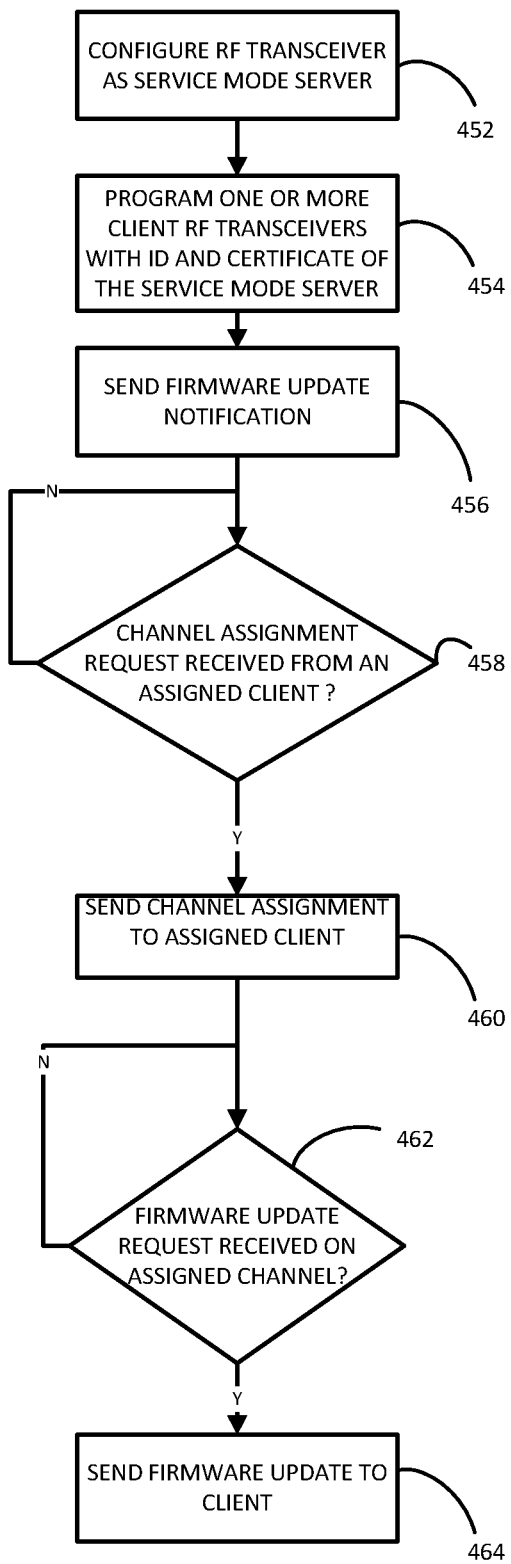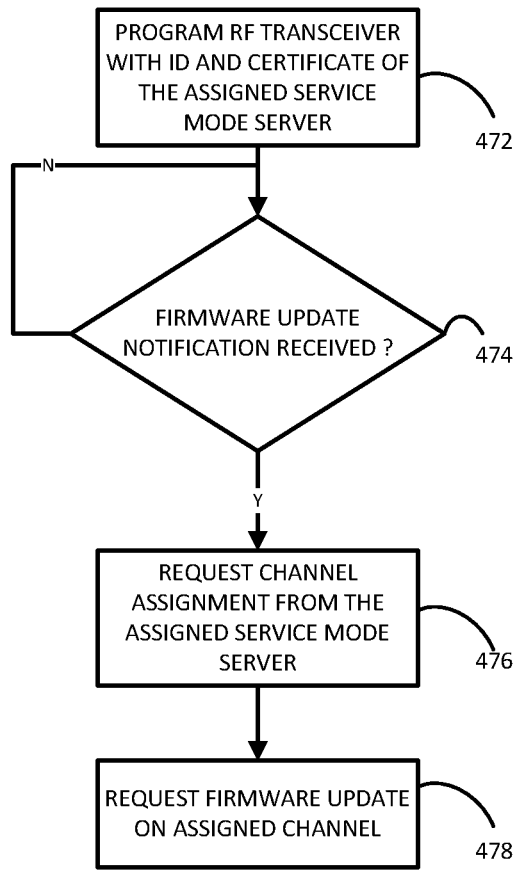
450
FIGURE 7A
470
FIGURE 7B

RF TRANSCEIVER AND WIRELESS MESH NETWORK

CROSS-REFERENCE TO RELATED APPLICATIONS

This application claims the priority under 35 U.S.C. § 119 of European Patent application no. 18306126.6, filed on 20 Aug. 2018, the contents of which are incorporated by reference herein.

FIELD

This disclosure relates to a radio frequency (RF) transceiver and a wireless mesh network including an RF transceiver.

BACKGROUND

A mesh network is a network topology where any given node in the mesh may communicate with any other node directly in the network. Mesh network topologies are often used to implement wireless networks because of the advantage of increased robustness if a particular point in the network fails. Mesh networks may be implemented according to the Zigbee wireless standard for networks used for example in lighting, heating and other building control systems. A full mesh network is a network where all nodes can communicate directly with all the other nodes in the network. For very large mesh networks where the individual nodes are spatially further apart, it may not be possible for example for a wireless network node to communicate with all the nodes in the mesh network directly because of the limitations of the power of the RF transceiver of the wireless node. These networks may be referred to as partial mesh networks. In operation, some data transfers may only be necessary between two nodes in a network. In other cases, for example if a firmware update is required, the data transfer may be from one node to many nodes.

SUMMARY

Various aspects of the disclosure are defined in the accompanying claims. In a first aspect there is provided a RF transceiver for a mesh network node, wherein the RF transceiver is configured in a normal mode of operation as a network node in a wireless mesh network and is configured in a service mode of operation as a network node in a tree network.

In one or more embodiments in the service mode of operation, the RF transceiver may be further configured as at least one of a server and a client. The RF transceiver may be configured to communicate to a single predetermined further RF transceiver when configured as a client, wherein the single predetermined further RF transceiver is configured as a server.

In one or more embodiments, the RF transceiver may comprise a memory circuit and, in the service mode of operation, the RF transceiver may be configured as a server and a client and further configured to receive a data request from a predetermined second further RF transceiver configured as a client, to check if the data requested is available in the memory circuit, and wherein if the data is available the RF transceiver may be further configured to transmit the data to the further RF transceiver, and if the data is not available the RF transceiver may be further configured to transmit a data request to the single predetermined further RF transceiver. The data may comprise a firmware update for the RF transceiver.

In one or more embodiments in the service mode of operation, the RF transceiver may be configured to send a firmware update notification to the second further RF transceiver prior to receiving the data request.

In one or more embodiments in the service mode of operation, the RF transceiver may be configured as a client and is configured to receive a firmware update notification from the single predetermined further RF transceiver and to send a firmware update data request in response to receiving the firmware update notification.

The service mode may be an over-the-air, OTA, programming mode of operation.

In one or more embodiments, the RF transceiver may comprise a processor; a memory circuit coupled to the processor; a server ID memory circuit coupled to the processor; a RF transmitter and a RF receiver coupled to the processor.

Embodiments of the RF transceiver may be included in a wireless network.

In one or more embodiments, in the service mode the network may comprise a plurality of clusters, each cluster comprising a first RF transceiver configured as a server and one or more further RF transceivers configured as clients and wherein the one or more further RF transceivers communicate only with the first RF transceiver, and wherein communication between RF transceivers in each cluster uses a predetermined radio channel.

In one or more embodiments, the first transceiver of each cluster may be configured to receive report data from each of the one or more further RF transceivers and to transmit report data of the cluster to a further server.

In a second aspect there is provided a method of operating a RF transceiver as a node in a network comprising in a normal mode configuring the RF transceiver as a node in a mesh network and in a service mode configuring the RF transceiver as a node in a tree network.

In one or more embodiments, the method may further comprise in the service mode configuring the RF transceiver as at least one of a server and a client and wherein the RF transceiver is configured to communicate to a predetermined network server node when configured as a client.

In one or more embodiments, the method may further comprise configuring the RF transceiver as a server and a client; receiving a data request at the RF transceiver from a network client node; checking if the data requested is available in the memory of the RF transceiver; if the data requested is available, transmitting the data to the network client node; if the data requested is not available, sending a data request from the RF transceiver to the predetermined network server node.

In one or more embodiments, the method may further comprise sending a firmware update notification prior to receiving the data request.

In one or more embodiments, the method may further comprise configuring the RF transceiver as a client; receiving a firmware update notification at the RF transceiver from the predetermined network server node; sending a firmware update data request from the RF transceiver to the predetermined network server node in response to receiving the firmware update notification.

In a third aspect there is described a computer program product comprising instructions which, when being executed by a processing unit, cause said processing unit to perform the steps of in a normal mode configuring the RF transceiver as a node in a mesh network and in a service mode configuring the RF transceiver as a node in a tree network.

BRIEF DESCRIPTION OF THE DRAWINGS

In the figures and description like reference numerals refer to like features. Embodiments of are now described in detail, by way of example only, illustrated by the accompanying drawings in which:

FIG. 7A shows a method of operation of an intermediate service mode server network node according to an embodiment.

FIG. 7B shows a method of operation of an intermediate service mode client network node according to an embodiment.

DESCRIPTION OF EMBODIMENTS

Figure 1A:
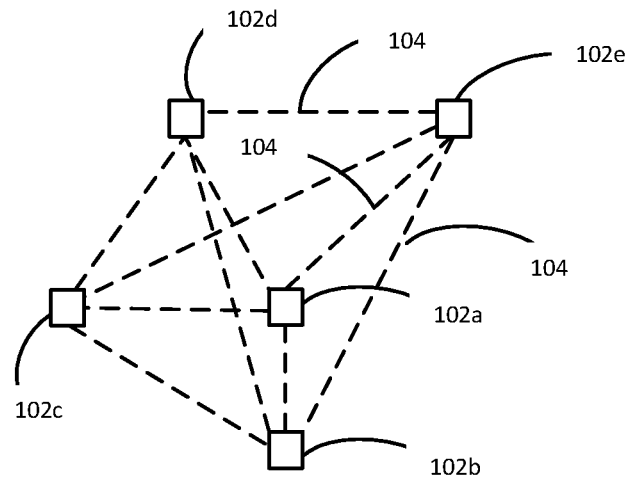
FIG. 1A shows an example of a mesh network

FIG. 1A shows an example of a mesh network 100. The mesh network 100 includes five nodes 102a, 102b, 102c, 102d, 102e. These nodes may typically include an RF transceiver to communicate with other nodes in the network. The allowed communication paths for the mesh network are illustrated by the dashed lines 104. The mesh network 100 as illustrated may be referred to as a full mesh network as all nodes can communicate directly with all other nodes. Any of the nodes 102a-e may act as a client or a server.

Figure 1B:
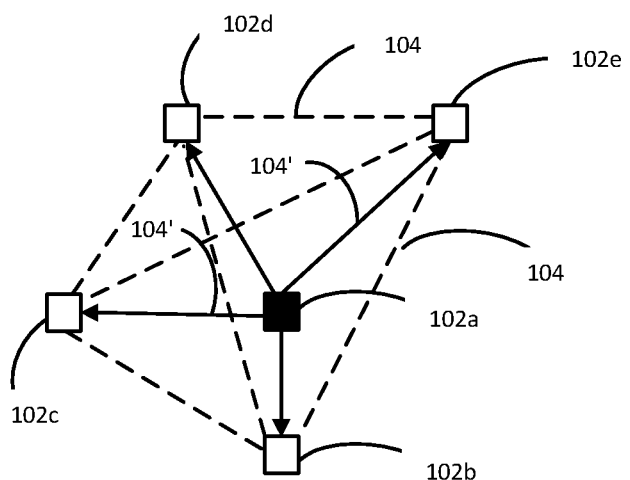
FIG. 1B illustrates the mesh network of FIG. 1B in an over the air (OTA) update mode

FIG. 1B shows the mesh network of FIG. 1A during an OTA firmware update. One of the nodes in the mesh network may have an update firmware image available and acts as the OTA server to distribute that image to the other nodes in the network. As illustrated, node 102a acts as an OTA server but the OTA server may also be any of nodes 102b-e. The node 102a may provide the OTA firmware update to the other nodes 102b-e in the mesh network 100 via the communication paths shown as solid lines 104'.

In larger mesh networks, in a service mode of operation such as an over the air (OTA) firmware update or any other OTA programming service, the service may become less reliable when the number of nodes increases. This may be because for example there are limited radio resources which are shared by all the nodes. Due to the limited radio resources, the probability of collisions on the radio interface of the nodes 102a-e may increase. Furthermore, the node acting as the OTA server 102a is required to perform more processing. This node 102a typically has limited processing power and limited memory. Because of the limited processing power, a service request from a large number of nodes may result in delays in performing the OTA service.

Figure 2:
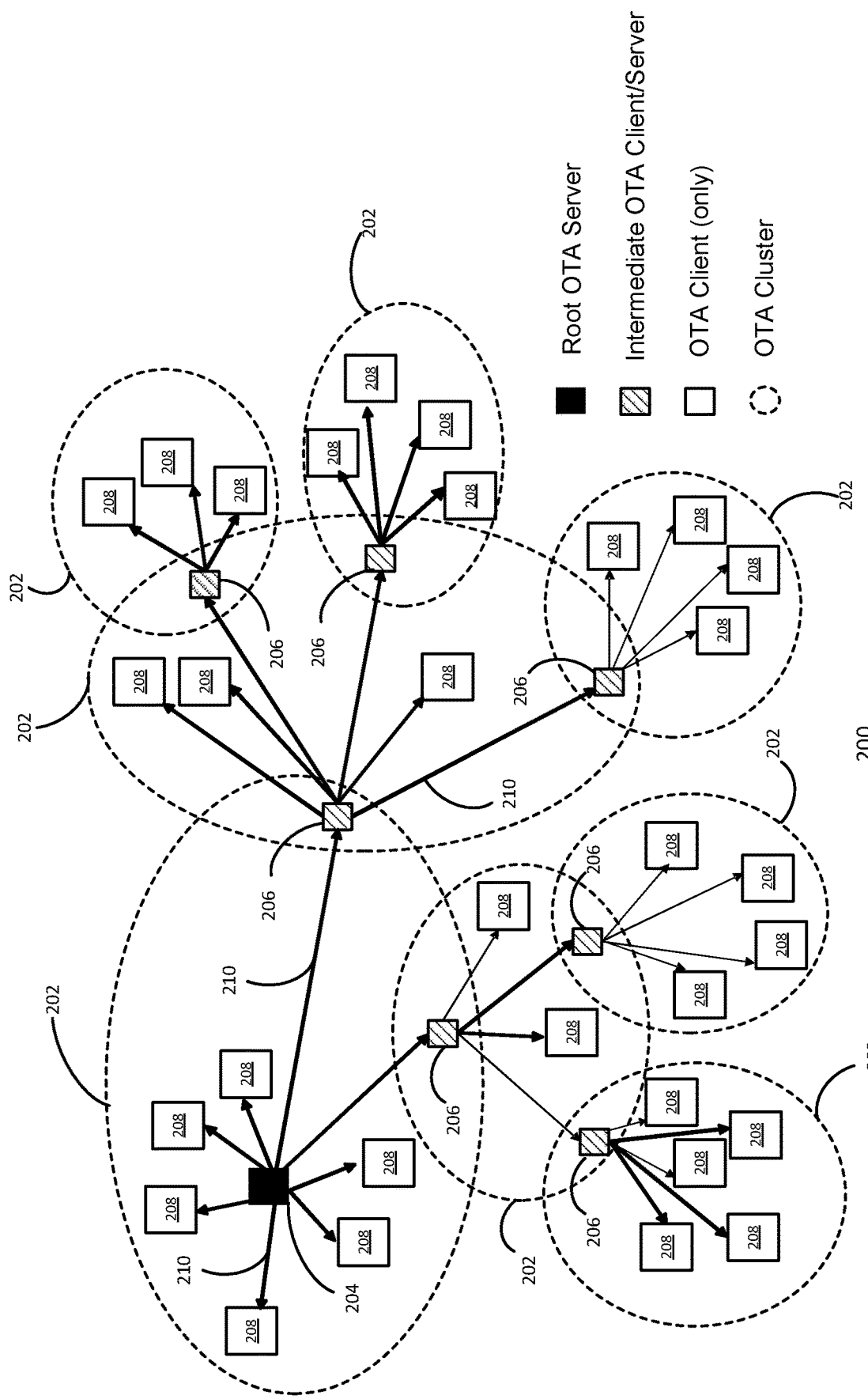
FIG. 2 illustrates a mesh network configured in a service mode according to an embodiment.

FIG. 2 shows a mesh network 200 according to an embodiment shown configured in a service mode. The normal mode mesh network connections have been omitted from the FIG. 2 but will be similar to those as illustrated in the network 100 in FIG. 1A. Nodes in the network are grouped into wireless mesh network service mode clusters 202. In one of the clusters 202, one of the network nodes is configured as a root service mode server node 204. In each of the remaining clusters, one of the network nodes is configured as an intermediate service mode server-client node 206. Only one node is configured as a server for the remaining nodes in each of the clusters 202. The remaining nodes 208 are configured as clients only. The root service-mode server node 204 and the intermediate service mode server-client nodes 206 are organised as a tree network with some slave servers and some master servers. The allowed communication paths 210 between the servers and clients are shown by the arrows. As illustrated, the direction of the communication paths 210 is from the root server node 204 to the client nodes 208 or the intermediate server nodes 206 and the intermediate server nodes 206 to the client nodes 208. However, it will be appreciated that data and messaging may also be sent in the opposite direction.

The root service mode server node 204 acts as a master with one or more slaves. The intermediate service mode server-client nodes 206 have one master and zero or more slaves. A slave server is also a client for its master server. Intermediate service mode server-client nodes 206 belong to two clusters and will act as a server in one cluster and a client in a different cluster. Any data required to be distributed in a service mode may be initially stored by the root service mode server node 204 before being transmitted to the target client node through the tree network.

The inventor of the present disclosure has appreciated that in a service mode of operation, instead of permitting each node to communicate with most or all the nodes in the network, by clustering the nodes and configuring the nodes as a tree network, the efficiency of service mode operations such as OTA firmware updates may be improved. In some examples, a predetermined or dedicated radio channel may be used per cluster. This may reduce the number of collisions during a service mode operation. In some examples, the service mode may include generating report data for the network. By generating the report data per cluster instead of per node, the root server processing time may be reduced. In other examples, specific actions to be performed by a target client node for the service mode data may be managed by the intermediate server-client node 206 in a cluster 202 rather than a server node as in the mesh network 100. This may reduce the processing required by the root server node 204. Furthermore, the network scalability of the mesh network 200 may be improved, since the addition of a new node to a cluster will not affect other nodes outside the cluster.

The service mode operation may include any 1-node to N-node file or data transfer such as a firmware update or other OTA programming service such as encryption keys or other configuration settings. The service mode may include any N-node to 1-node data transfer of for example log files or report files. In some examples, the nodes 206, 208 may be sensors, sensing for example temperature, light, pressure, humidity, audio level, presence or some other parameter. Each intermediate node 208 may be responsible for a particular kind of sensor. Each intermediate node 206 may combine the data from the data received from client nodes 208. This combined data may be the aggregation of the received data. The data may be report or logging data such as timestamped lists of temperatures, sound levels. The report of logging data may be for example a timestamped list of events such as movement detection, or faults detected by a network node in a cluster. In some examples, the root node 204 may be a gateway to the cloud.

Figure 3:
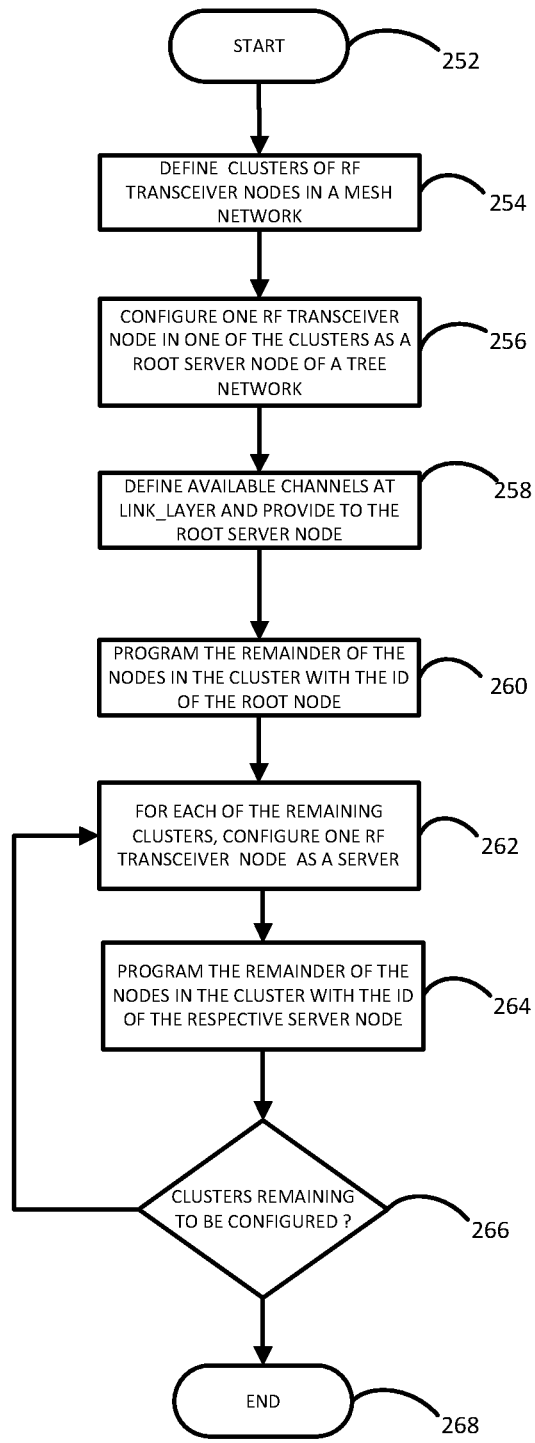
FIG. 3 illustrates a method of configuring a mesh network according to an embodiment.

FIG. 3 illustrates a configuration method for a wireless mesh network service mode 250. The configuration method 250 may be used for example to configure the wireless mesh network 200. The method starts at step 252, and in step 254 clusters of RF transceiver nodes in the mesh network may be defined. One service-mode server node is allocated for each cluster.

In step 256 an RF transceiver node one of the clusters is configured as a root server node of a tree network. This root server node may be for example the service mode server node 204 illustrate FIG. 2. In step 258, the available channels may be defined at a link layer and provided to the root server node. In step 260, the remainder of the nodes in the cluster may be programmed with the ID and possibly the certificate of the root node.

In step 262, for each of the remaining clusters one RF transceiver node may be configured as a server node. This server node may be for example the intermediate service mode server-client node 206. In step 264 the remainder of the nodes in a specific cluster may be programmed with the ID of the respective server node for that cluster. The remainder of the nodes will all act as clients for the respective server node in that cluster. In step 266, a check may be made to see if there are any remaining clusters still to be configured. If all the clusters have been configured then the method moves to step 268 and terminates. If there are clusters remaining to be configured, then the method returns to step 262.

The method 250 configures the nodes which normally operate in a mesh network as a tree network in a service mode of operation. The method 250 provides information on the set of channels available at link layer level and may make the root server aware of these channels. In operation, prior to sending a service request such as an OTA request, a client may request a radio channel assignment to the server using a dedicated message. In some examples this channel assignment may be valid only for a limited period of time. The server node may assign set of channels to a respective client. For intermediate server client nodes, once the intermediate server client node has received an assigned channel or set of channels, the intermediate server client node may then assign channels to its respective clients. By using dedicated radio channels during a service mode in each cluster, the probability of interference may be reduced which may allow the network to operate more efficiently.

In some examples the tree network for service mode may be configured dynamically. For example, in a Zigbee network, OTA server network addresses may be discovered if the OTA client is not pre-configured.

In one example, the OTA client could use the first discovered OTA server. In other examples, the client may build a list of OTA servers and select the server using link quality, provided that the link quality is reported to the network layer.

In other examples, the OTA client may select the nearest OTA server. For example, the GPS (Global Positioning System) coordinates of the OTA server may be transmitted by one of the messages exchanged during the discovery procedure. This technique requires that all nodes in the mesh network support GPS and that GPS service is available during the discovery procedure.

Alternatively, the nearest OTA server could be defined as the one with the smallest Round Trip Time (RTT). This technique does not require any change of the protocol. The RTT can be measured by the OTA client by triggering several discovery procedures and by computing the average RTT for each responding OTA server. If only one procedure is triggered, then the nearest OTA server will be the first that answers.

In other examples, the OTA client may select the OTA server based on characteristics of devices already bound to the OTA server. For example, the OTA client may select the OTA server with OTA clients of the same kind as determined from the Manufacturer ID and or the hardware version. In this example, only a limited number of OTA Firmware image data would have to be managed by the OTA server for a particular cluster.

Figure 4:
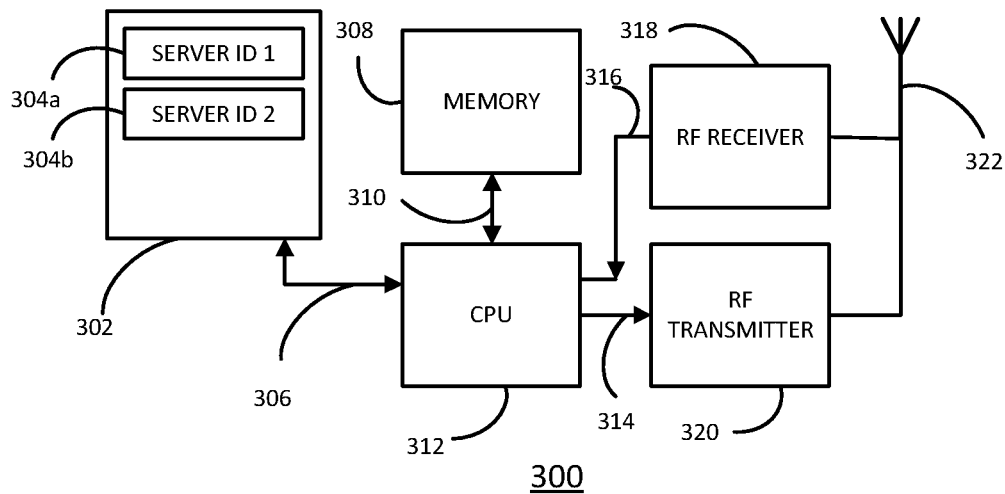
FIG. 4 Shows an RF transceiver configured as a network node according to an embodiment.

FIG. 4 shows an example RF transceiver 300 which may be included in a network mode for example in the wireless mesh network 200. The RF transceiver 300 may be configured as a service mode root server node 204. In other examples, the RF transceiver 300 may be configured as an intermediate service mode server client node 206. In other examples, the RF transceiver 300 may be configured as a service mode client node 208. The RF transceiver may have a server identification (ID) memory 302, a memory 308, a processor 312, an RF transmitter 320, an RF receiver 318, and an antenna 322. The processor 312 may be coupled to the memory via communication bus 310. The processor 312 may be coupled to the server ID memory by server ID communication bus 306. The processor 312 may have an output 314 connected to the RF transmitter 320. The processor 312 may have an input 360 connected to the output 316 of the RF receiver 318. In operation, the RF transceiver 300 may receive data via the antenna 322 and the RF receiver 318.

The received data may be processed by the processor 312. The processor 312 may generate data for transmission to another node in the network via the RF transmitter 320 and the antenna 322. In some examples the processor 312 of the RF transceiver 300 may be coupled to a lighting circuit and/or a heating control circuit (not shown). Alternatively, or in addition, in some examples, the RF transceiver 300 may be connected to a temperature sensor and/or a motion sensor (not shown). Alternatively, or in addition, in some examples, the RF transceiver 300 may be connected to a current sensor for measuring electrical current (not shown). In some examples, the RF transceiver 300 may be incorporated into a lighting control luminaire, smart meter, or heating controller or other Internet of Things (IOT) device that is included in a mesh network.

During the network configuration procedure, the processor 312 may store predefined server IDs 304a, and 304b in the server ID memory 302. The RF transceiver 300 may receive the server IDs 304a, 304b transmitted from another wireless device via the antenna 322 and the RF receiver 318. In order to configure RF transceiver as a node in a tree network only one server ID 304a is required. In some examples the additional server 304b may be programmed with the server ID of the root server node 204 illustrated in the mesh network 200 in FIG. 2. In this case if the tree network server node becomes unreachable, the RF transceiver 300 may attempt to communicate with the root server node 204 directly and so revert to a mesh network topology. In other examples, if the tree network server node becomes unreachable, the RF transceiver 300 when acting as a client may reconfigure itself within another cluster by communicating with another server node. The server node may be the root server node 204 or another intermediate server node 206. This other server node may be selected using any of the methods described herein for example based on link quality, round trip time, GPS location, or device characteristics used to configure the RF transceiver 300 for the original server node. In this case, the cluster 202 associated with the unreachable server node no longer exists and the other client nodes 208 belonging to that cluster may similarly reassign to other clusters. When configured as a server, the RF transceiver 300 may store the data such as an OTA firmware update in the memory 308 for transmission to a client in a service mode. In some examples, the server ID memory 302 and the memory 308 may be combined. The server ID memory 302 and the memory 308 may be implemented as SDRAM, DRAM or other memory circuits.

Figure 5:
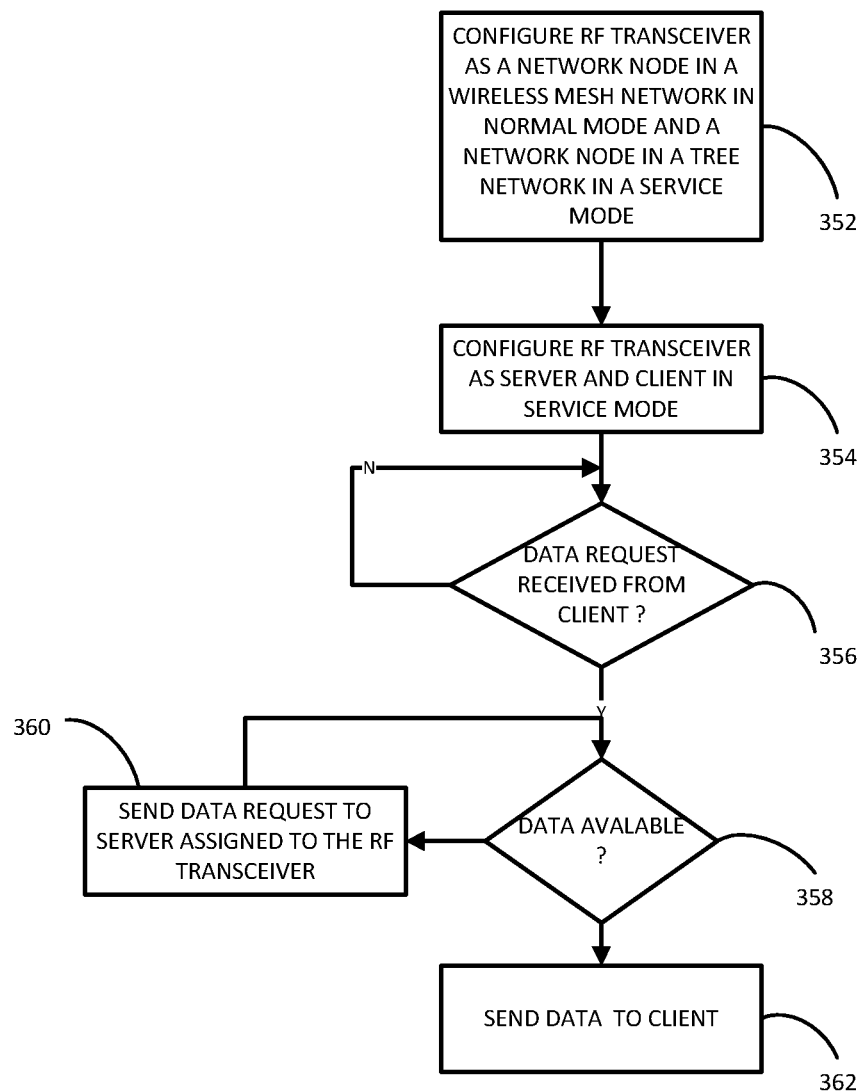
FIG. 5 shows a method of operation of an intermediate service mode server-client network node according to an embodiment.

FIG. 5 shows a method of operation of an intermediate service mode server-client node 350. In step 352 an RF transceiver, for example the RF transceiver 300, may be configured as a network mode in a wireless mesh network in the normal mode of operation and in network node in a tree network in a service mode of operation. In some examples, the RF transceiver may be configured to operate in each mode concurrently. In other examples, the RF transceiver may be configured to switch between the normal mode configuration and the service mode configuration.

The configuration step 352 may include for example the method 250 illustrated in FIG. 2. In step 354 the RF transceiver may be configured as a server and a client in a service mode. The RF transceiver configured in this way may act as an intermediate service mode server-client node 206 in the network 200 illustrated in FIG. 2. In step 356 the RF transceiver may check to see whether a data request has been received from a client. If a data request has not been received, the method remains at step 356. If a data request has been received from a client, the RF transceiver checks to see whether the data is available in step 358. This check may be done for example in the RF transceiver 300 by determining if the data is available in the memory 308. If the data is not available, then in step 368 a data request may be sent to the server assigned to the RF transceiver. After step 360, the method then returns to step 358. If the data is available in step 358, the method proceeds to step 362 and the data may be sent to the client for example via RF transmitter 320 and antenna 322.

An intermediate service mode server-client node configured according to the method 350 may reduce the processing required by a root server node operating in service mode since for multiple clients. This is because after the first client data request, the intermediate service mode server-client node may store the data and consequently does not need to request the service mode data each time it gets a subsequent request from the other client nodes.

Figure 6:
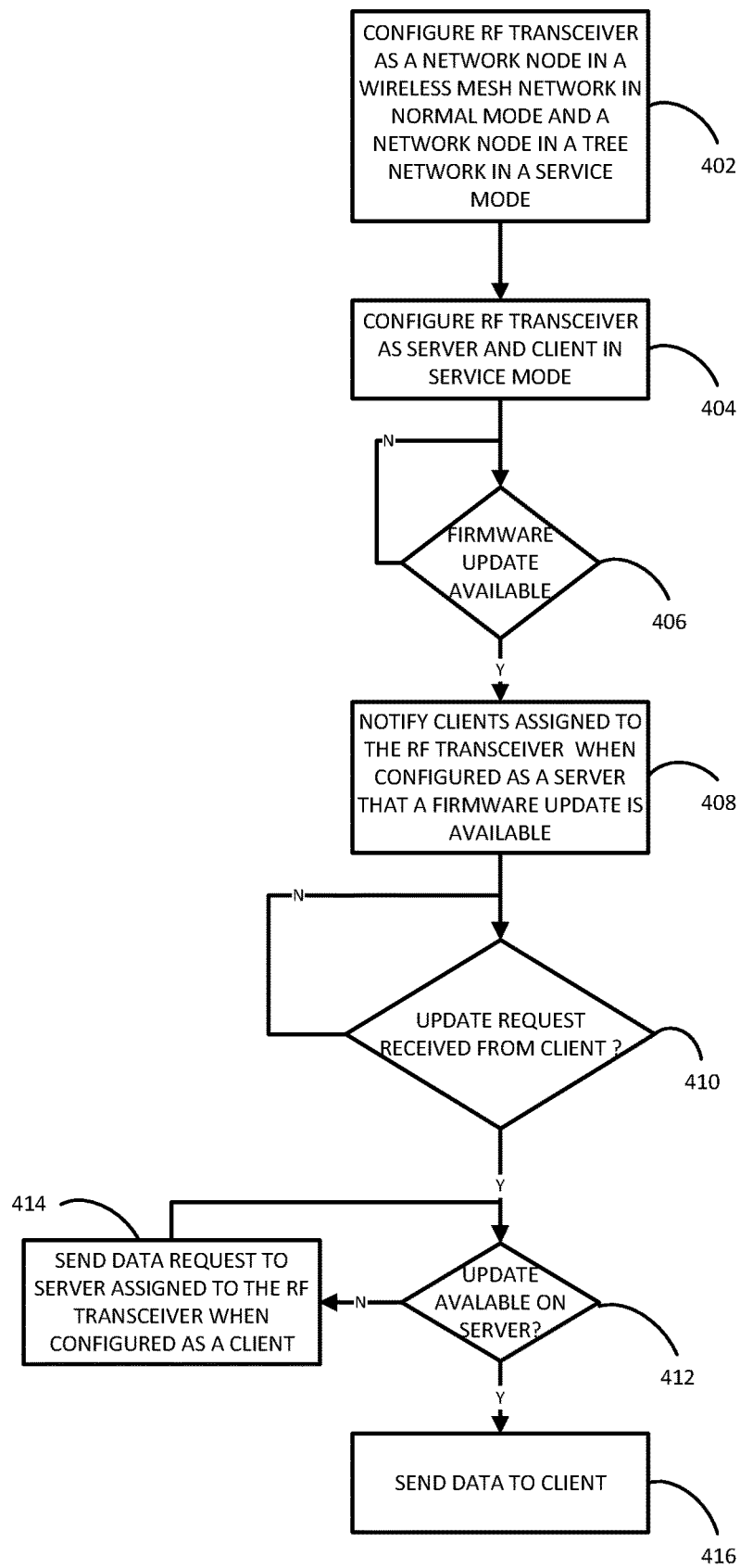
FIG. 6 shows a method of operation of an intermediate service mode server-client network node according to an embodiment.

FIG. 6 shows a method of operation of an intermediate service mode server-client node for an OTA firmware update 400. In step 402, an RF transceiver, for example the RF transceiver 300 may be configured as a network mode in a wireless mesh network in a normal mode of operation and a network mode in a tree network in a service mode of operation. In step 404 the RF transceiver may be configured as a server and a client in the service mode. In step 406, the RF transceiver may check to see whether or not firmware update is available. If a firmware update is not available then the method remains at step 406. If a firmware update is available then in step 408 the RF transceiver may notify the clients assigned to the RF transceiver when configured as a server that a firmware update is available. After the notification has been sent in step 408, in step 410 the RF transceiver may check to see if an update request has been received from a client. If an update request has not been received from a client then the method stays at step 410. If an update request has been received from a client then in step 402 the RF transceiver checks whether the update data is available locally. If the update data is not available locally, then in step 414 the RF transceiver sends a data request to the server assigned to the RF transceiver when configured as a client. The method then returns to step 412. If the update is available locally on the RF transceiver when configured as a server, then in step 416 the data may be sent to the client.

An intermediate service mode server-client node configured according to the method 400 may reduce the processing required by a root server node for OTA Firmware updates. This is because after the first client data request, the intermediate service mode server-client node may store the firmware update and consequently does not need to request the update each time it gets a subsequent request from the other client nodes.

FIG. 7A shows a method of configuring and operating a RF transceiver as a service mode server in a tree network according to an embodiment. In step 452 and RF transceiver, for example the RF transceiver 300 may be configured as a service mode server. In step 454, one or more client RF transceivers may be allocated the ID and if necessary the certificate of the service mode server. The client RF transceivers may be implemented for example by an RF transceiver 300. The Server ID and optionally the certificate may for example be stored in the server ID memory 302 of the client RF transceiver. In step 456 the service mode server may send a firmware update notification to one or more service mode clients assigned to the server. In step 458, a channel assignment request may be received from one of the assigned clients. If no channel assignment has been received, the method remains at step 458. If channel assignment request has been received, then in step 460 a channel assignment may be sent to the client. With reference to the network 200 illustration of FIG. 2, the channels assigned may be different in each cluster 202 to avoid interference. In step 462 the service mode server checks to see whether a firmware update request has been received on the assigned channel. If a firmware update request has not been received, the method remains at step 462. If a firmware update request has been received, then in step 464 a firmware update may be sent to the client.

FIG. 7B shows a method of configuring and operating a RF transceiver as a service mode client in a tree network 470 according to an embodiment. In step 472 an RF transceiver, for example the RF transceiver 300 may be assigned the ID and optionally the certificate of a service mode server. In step 474 the RF transceiver may check whether a firmware update notification has been received from the assigned server. If a firmware notification has not been received, the method remains at step 474. If a firmware update notification has been received then in step 476, the RF transceiver may request a channel assignment from the assigned service mode server. Once the assigned channel has been received, in step 478 the service mode client requests a firmware update on the assigned channel.

Some nodes in the network may be configured to operate with both the method 450 and the method 470, for example the intermediate service mode client server nodes 206 in network 200. Other nodes in the network may be configured to operate just as a server according to method 450, for example the root server node 204 the network 200. Other nodes in the network may be configured to operate just as a client according to method 470, for example the client nodes 208 in network 200.

Figure 8:
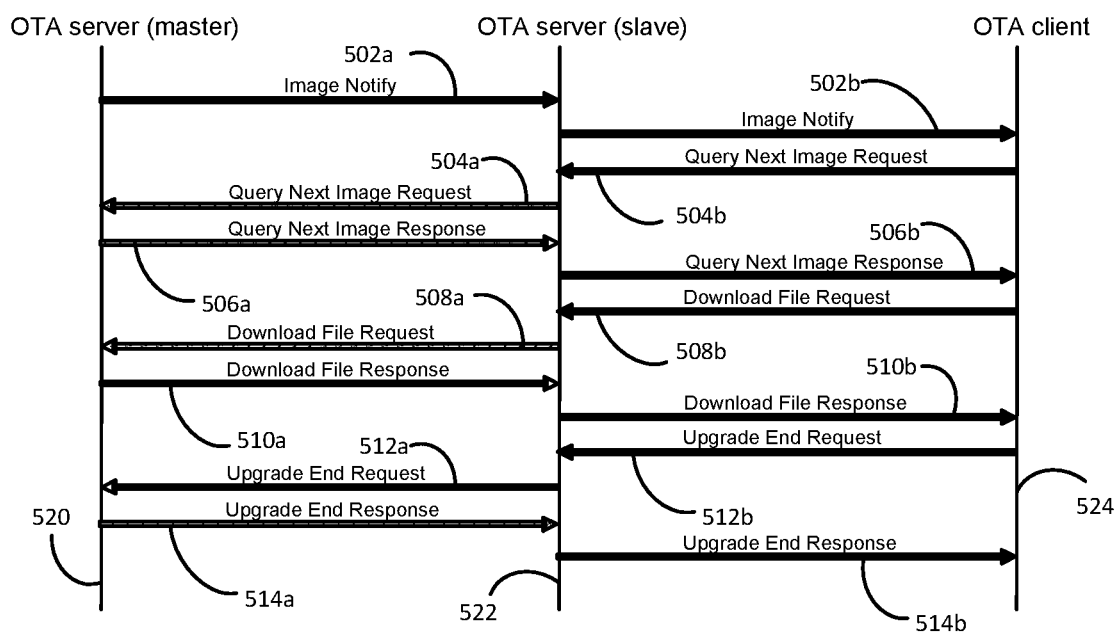
FIG. 8 shows a method for OTA firmware update of a master server, slave server and client configured in a network according to an embodiment.

FIG. 8 shows an OTA firmware update according to the Zigbee protocol 500 in a network configured according to an embodiment. As illustrated in FIG. 8 the transactions are shown between an OTA master server 520, an OTA slave server 522 and an OTA client. 524. With reference to the network 200, the root server node 204 may act as an OTA master server 520.

The intermediate service mode server-client node may act as either an OTA master server 520 or an OTA slave server 522. The service mode client node 208 or intermediate service mode server client node 206 may act as an OTA client 524.

In step 502a, an image notification is sent from the OTA master server 520 to the OTA slave server 522. In step 502b, the image notification is forwarded by the OTA slave server 522 to the OTA client 524. In step 504b, The OTA client 524 sends a query next image request to the OTA slave server 522. In step 504a, the OTA slave server 522 sends the query next image request to the OTA master server 520. In step 506a, the OTA master server 520 sends the query next image response to the OTA slave server 522. In step 506b, the OTA slave server 522 sends the query next image response to the OTA client 524. In step 508b, the OTA client 524 then sends a download file request to the OTA slave server 522. The OTA slave server 522 then sends the download file request 508a to the OTA master server 520. The OTA master server 520 then sends the download file response 510a to the OTA slave server 522. The OTA slave server 522 sends the download file response 510b to the OTA client 524. When the file download has been completed, in step 512b the OTA client 524 sends an upgrade end request to the OTA slave server 522. The OTA slave server 522 sends the upgrade end request 512a to the OTA master server 520. The OTA master server 520 sends the upgrade end response 514a to the OTA slave server 522. The OTA slave server 522 sends the upgrade end response 514b to the OTA client 524.

All steps shown in OTA update message 500 are only necessary for the first firmware update request from a client in a cluster. For subsequent requests, the message exchanges 504a, 506a, 508a, 510a, 512a, 514a, between the OTA server master 520 and the OTA server slave 522 may be omitted, since the firmware update data may already be available on the OTA slave server 522. Consequently, this may reduce the processor loading on the OTA master server 520.

A RF transceiver for a mesh network node is described. The RF transceiver is configured in a normal mode of operation as a network node in a wireless mesh network and is configured in a service mode of operation as a network node in a tree network.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

TABLE OF REFERENCE SIGNS

| | |
|---|---|
| 100 | Mesh network |
| 102a to 102e | Wireless network nodes |
| 104 | Permitted communication paths between wireless nodes normal mode |
| 104' | Example communication path in OTA mode |
| 150 | Mesh network in OTA mode |
| 200 | Mesh network according to an embodiment shown configured in service mode |
| 202 | Wireless mesh network service mode cluster |
| 204 | Root service mode server node |
| 206 | Intermediate service mode server-client node |
| 208 | Service mode client node |
| 210 | Allowed communication path, service mode |
| 250 | Configuration method for wireless mesh network service mode |
| 252 | Method start |
| 254 | Define clusters of RF transceiver nodes in a mesh network |
| 256 | Configure one RF transceiver node in one of the clusters as a root server node of a tree network |
| 258 | Define available channels at link-layer and provide to the root server node |
| 260 | program the remainder of the nodes in the cluster with the id of the root node |
| 262 | for each of the remaining clusters, configure one RF transceiver node as a server |
| 264 | program the remainder of the nodes in the cluster with the id of the respective server node |
| 266 | check if clusters remaining to be configured |
| 268 | method end |
| 300 | RF transceiver |
| 302 | Server ID memory |
| 304a-b | Server IDs |
| 306 | Processor connection to Server ID memory |
| 308 | Memory |
| 310 | Communication bus between memory and processor |
| 312 | processor |
| 314 | RF transmitter input from processor |
| 316 | RF receiver output to processor |
| 318 | RF receiver |
| 320 | RF transmitter |
| 322 | Antenna |
| 350 | Method of operation of intermediate service mode server-client node |
| 352 | Configure RF transceiver as a network node in a wireless mesh network in normal mode |

-continued

TABLE OF REFERENCE SIGNS

| | |
|---|---|
| | and a network node in a tree network in a service mode |
| 354 | Configure RF transceiver as server and client in service mode |
| 356 | Check if data request received from client |
| 358 | Check if data available |
| 360 | Send data request to server assigned to the RF transceiver |
| 362 | Send data to client |
| 400 | Method of operation of intermediate service mode server-client node for OTA firmware update |
| 402 | configure RF transceiver as a network node in a wireless mesh network in normal mode and a network node in a tree network in a service mode |
| 404 | configure RF transceiver as server and client in service mode |
| 406 | Firmware update available |
| 408 | notify clients assigned to the RF transceiver when configured as a server that a firmware update is available |
| 410 | check update request received from client |
| 412 | update available on server? |
| 414 | send data request to server assigned to the RF transceiver when configured as a client |
| 416 | send data to client |
| 450 | Method of configuring and operating an RF transceiver as a service mode server in a tree network. |
| 452 | Configure RF transceiver as service mode server |
| 454 | Program one or more client RF transceivers with id and certificate of the service mode server |
| 456 | Send firmware update notification |
| 458 | Check if channel assignment request received from an assigned client? |
| 460 | Send channel assignment to assigned client |
| 462 | check if firmware update request received on assigned channel? |
| 464 | Send firmware update to client |
| 470 | Method of configuring and operating an RF transceiver as a service mode client in a tree network. |
| 472 | Program RF transceiver with ID and certificate of the assigned service mode server |
| 474 | Firmware update notification received? |
| 476 | Request channel assignment from the assigned service mode server |
| 478 | Request firmware update on assigned channel |
| 500 | Transaction diagram of firmware update of a client using the Zigbee protocol in a network according to an embodiment including a master server, slave server and client |
| 502a | Image notify between OTA master server and OTA slave server acting as client to OTA master server |
| 502b | Image notify between OTA slave server and OTA client |
| 504a | Query Next Image Request between OTA master server and OTA slave server acting as client to OTA master server |
| 504b | Query Next Image Request between OTA slave server and OTA client |
| 506a | Query Next Image Response between OTA master server and OTA slave server acting as client to OTA master server |
| 506b | Query Next Image Response between OTA slave server and OTA client |
| 508a | Download File Request between OTA master server and OTA slave server acting as client to OTA master server |
| 508b | Download File Request between OTA slave server and OTA client |
| 510a | Download File Response between OTA master server and OTA slave server acting as client to OTA master server |
| 510b | Download File Response between OTA slave server and OTA client |
| 512a | Upgrade End Request between OTA master server and OTA slave server acting as client to OTA master server |
| 512b | Upgrade End Request between OTA slave server and OTA client |
| 514a | Upgrade End Response between OTA master server and OTA slave server acting as client to OTA master server |
| 514b | Upgrade End Response between OTA slave server and OTA client |
| 520 | OTA master server |
| 522 | OTA slave server |
| 524 | OTA client |

The invention claimed is:

1. A mesh network node comprising:
a radio frequency (RF) transceiver, wherein the RF transceiver comprises a memory circuit and is configured in a normal mode of operation as a network node in a wireless mesh network and is configured in a service mode of operation as a network node in a tree network,
wherein in the service mode of operation, the RF transceiver is further configured as at least one of a server and a client,
when configured as a client in the service mode of operation, the RF transceiver is configured to communicate to a single predetermined first further RF transceiver, wherein the single predetermined first further RF transceiver is configured as a server, and
when configured as a server and a client in the service mode of operation, the RF transceiver, configured as a server, is further configured to receive a data request from a predetermined second further RF transceiver configured as a client, to check if the data requested is available in the memory circuit, and wherein if the data is available the RF transceiver is further configured to transmit the data to the second further RF transceiver, and if the data is not available the RF transceiver, configured as a client, is further configured to transmit the data request to the single predetermined further RF transceiver configured as a server.

2. The mesh network node of claim 1 wherein the data comprises a firmware update for the RF transceiver.

3. The mesh network node of claim 2 wherein in the service mode of operation, the RF transceiver is configured to send a firmware update notification to the second further RF transceiver prior to receiving the data request.

4. The mesh network node of claim 1 wherein in the service mode, the RF transceiver is configured as a client and is configured to receive a firmware update notification from the single predetermined first further RF transceiver and to send a firmware update data request in response to receiving the firmware update notification.

5. The mesh network node of claim 1 wherein the service mode is an over-the-air (OTA) programming mode of operation.

6. The mesh network node according to claim 1, wherein the RF transceiver comprises:
a processor coupled to the memory circuit;
a server ID memory circuit coupled to the processor;

a RF transmitter and a RF receiver coupled to the processor.

7. A mesh network comprising a plurality of mesh network nodes, each mesh network node, comprising:
   a radio frequency (RF) transceiver, wherein the RF transceiver comprises a memory circuit and is configured in a normal mode of operation as a network node in a wireless mesh network and is configured in a service mode of operation as a network node in a tree network, wherein in the service mode, the mesh network comprises a plurality of clusters, each cluster comprising a first RF transceiver configured as a server and one or more further RF transceivers configured as clients and wherein the one or more further RF transceivers communicate only with the first RF transceiver, and wherein communication between RF transceivers in each cluster uses a predetermined radio channel.

8. The network of claim 7 wherein the first RF transceiver of each cluster is configured to receive report data from each of the one or more further RF transceivers and to transmit the report data of the cluster to a further server.

9. A method of operating a RF transceiver as a node in a network comprising in a normal mode configuring the RF transceiver as a node in a wireless mesh network and in a service mode configuring the RF transceiver as a node in a tree network, the method comprising:
   in the service mode, configuring the RF transceiver as at least one of a server and a client, wherein when configured as a client in the service mode, the RF transceiver communicating with a predetermined network server node;
   in the service mode, configuring the RF transceiver as a server and client, wherein the method further comprises:
      receiving a data request at the RF transceiver, configured as a server, from a network client node;
      checking if the data requested is available in the memory of the RF transceiver;
      if the data requested is available, transmitting the data to the network client node;
      if the data requested is not available, sending a data request from the RF transceiver, configured as a client, to the predetermined network server node, configured as a server.

10. The method of claim 9 further comprising:
   configuring the RF transceiver as a client;
   receiving a firmware update notification at the RF transceiver from the predetermined network server node;
   sending a firmware update data request from the RF transceiver to the predetermined network server node in response to receiving the firmware update notification.

* * * * *